(12) United States Patent
Horita

(10) Patent No.: US 11,465,408 B2
(45) Date of Patent: Oct. 11, 2022

(54) LIQUID DISCHARGE APPARATUS, MOBILE DEVICE, AND POWER UNIT

(71) Applicant: SEIKO EPSON CORPORATION, Tokyo (JP)

(72) Inventor: Ryohei Horita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 17/104,042

(22) Filed: Nov. 25, 2020

(65) Prior Publication Data
US 2021/0154993 A1 May 27, 2021

(30) Foreign Application Priority Data
Nov. 27, 2019 (JP) .............................. JP2019-214342

(51) Int. Cl.
| | |
|---|---|
| B41J 2/045 | (2006.01) |
| B41J 29/38 | (2006.01) |
| B41J 3/36 | (2006.01) |
| B41J 2/14 | (2006.01) |

(52) U.S. Cl.
CPC ............. B41J 2/04501 (2013.01); B41J 2/14 (2013.01)

(58) Field of Classification Search
CPC .... B41J 2/04501; B41J 2/04548; B41J 29/38; B41J 29/393; B41J 3/36; B41J 3/39
See application file for complete search history.

(56) References Cited

U.S. PATENT DOCUMENTS

2003/0048323 A1* 3/2003 Kaburagi ............... B41J 29/393
347/19
2015/0094873 A1* 4/2015 Ohhashi ................ G05B 15/02
700/297

FOREIGN PATENT DOCUMENTS

JP 2016-175374 A 10/2016

* cited by examiner

*Primary Examiner* — Scott A Richmond
(74) *Attorney, Agent, or Firm* — Global IP Counselors, LLP

(57) ABSTRACT

A liquid discharge apparatus includes a drive signal output circuit configured to output a drive signal, a power unit configured to supply a power source voltage to the drive signal output circuit, and a first housing that accommodates the drive signal output circuit, and the power unit. The power unit includes a power supply circuit configured to convert an alternating voltage into a first direct voltage and a second direct voltage, and output the first direct voltage, a substrate on which the power supply circuit is provided, a solid state battery configured to output a third direct voltage corresponding to a stored electric charge, a charging circuit configured to store an electric charge in the solid state battery based on the second direct voltage, and a second housing that accommodates the power supply circuit, the solid state battery, and the charging circuit.

6 Claims, 14 Drawing Sheets

LIQUID DISCHARGE APPARATUS, MOBILE DEVICE, AND POWER UNIT

The present application is based on, and claims priority from JP Application Serial Number 2019-214342, filed Nov. 27, 2019, the disclosure of which is hereby incorporated by reference herein in its entirety.

BACKGROUND

1. Technical Field

The present disclosure relates to a liquid discharge apparatus, a mobile device, and a power unit.

2. Related Art

Lightweight compact portable mobile devices have been proposed. JP-A-2016-175374 for example discloses, as an example mobile device, a portable printing apparatus. The printing apparatus includes a battery such as a lithium-ion battery, and is configured to derive power from the battery and charge the battery by using power supplied through an alternating current (AC) adapter that is coupled to a commercial AC power supply.

To increase the portability of the mobile devices like the printing apparatus described in JP-A-2016-175374, powering by long-lasting batteries is increasingly demanded. To provide the powering by the long-lasting batteries, however, it is necessary to increase the capacity of the batteries, and thus increase the battery size. As a result, the mobile devices like the printing apparatus become larger, and this may decrease the portability of the mobile devices. To prevent the decrease in portability of the mobile devices, an environment for charging batteries may be provided. To provide such an environment for charging batteries, however, it is necessary to carry around an additional power supply circuit such as an AC adapter for charging batteries, and this may decrease the portability of the mobile devices.

The mobile devices like the portable printing apparatus described in JP-A-2016-175374 thus have room for improvement for their longer powering and portability.

SUMMARY

A liquid discharge apparatus according to an aspect of the present disclosure includes a drive signal output circuit configured to output a drive signal, a drive section comprising a discharge head configured to discharge a liquid in accordance with the drive signal, a power unit configured to supply a power source voltage to the drive signal output circuit, and a first housing that accommodates the drive signal output circuit, the drive section, and the power unit. The power unit includes a power supply circuit configured to convert an alternating voltage into a first direct voltage and a second direct voltage, and output the first direct voltage as the power source voltage, a substrate on which the power supply circuit is provided, a solid state battery configured to output a third direct voltage corresponding to a stored electric charge as the power source voltage, a charging circuit configured to store an electric charge in the solid state battery based on the second direct voltage, and a second housing that accommodates the power supply circuit, the solid state battery, and the charging circuit.

In the liquid discharge apparatus according to the aspect, the power supply circuit may include a first element and a second element that is different from the first element, the substrate may have a first surface and a second surface that is different from the first surface, the first element and the second element may be disposed on the first surface of the substrate, a shortest distance between the solid state battery and the first surface may be shorter than a shortest distance between the solid state battery and the second surface, and the solid state battery may be disposed between the first element and the second element.

In the liquid discharge apparatus according to the aspect, the power supply circuit may include a first element, the substrate may have a first surface and a second surface that is different from the first surface, the first element may be disposed on the first surface, and a shortest distance between the solid state battery and the second surface may be shorter than a shortest distance between the solid state battery and the first surface.

In the liquid discharge apparatus according to the aspect, the first element may be a coil.

In the liquid discharge apparatus according to the aspect, the charging circuit may be provided on the substrate.

In the liquid discharge apparatus according to the aspect, the power unit may include a switch circuit configured to switch between outputting the first direct voltage as the power source voltage and outputting the third direct voltage as the power source voltage.

A mobile device according to an aspect of the present disclosure includes a drive signal output circuit configured to output a drive signal, a drive section configured to operate in accordance with the drive signal, a power unit configured to supply a power source voltage to the drive signal output circuit, and a first housing that accommodates the drive signal output circuit, the drive section, and the power unit. The power unit includes a power supply circuit configured to convert an alternating voltage into a first direct voltage and a second direct voltage, and output the first direct voltage as the power source voltage, a substrate on which the power supply circuit is provided, a solid state battery configured to output a third direct voltage corresponding to a stored electric charge as the power source voltage, a charging circuit configured to store an electric charge in the solid state battery based on the second direct voltage, and a second housing that accommodates the power supply circuit, the solid state battery, and the charging circuit.

In the mobile device according to the aspect, the power supply circuit may include a first element and a second element that is different from the first element, the substrate may have a first surface and a second surface that is different from the first surface, the first element and the second element may be disposed on the first surface of the substrate, a shortest distance between the solid state battery and the first surface may be shorter than a shortest distance between the solid state battery and the second surface, and the solid state battery may be disposed between the first element and the second element.

In the mobile device according to the aspect, the power supply circuit may include a first element, the substrate may have a first surface and a second surface that is different from the first surface, the first element may be disposed on the first surface, and a shortest distance between the solid state battery and the second surface may be shorter than a shortest distance between the solid state battery and the first surface.

In the mobile device according to the aspect, the first element may be a coil.

In the mobile device according to the aspect, the charging circuit may be provided on the substrate.

In the mobile device according to the aspect, the power unit may include a switch circuit configured to switch between outputting the first direct voltage as the power source voltage and outputting the third direct voltage as the power source voltage.

A power unit according to an aspect of the present disclosure includes a power supply circuit configured to convert an alternating voltage into a first direct voltage and a second direct voltage, and output the first direct voltage as an output voltage, a substrate on which the power supply circuit is provided, a solid state battery configured to output a third direct voltage corresponding to a stored electric charge as the output voltage, a charging circuit configured to store an electric charge in the solid state battery based on the second direct voltage, and a housing that accommodates the power supply circuit, the solid state battery, and the charging circuit.

In the power unit according to the aspect, the power supply circuit may include a first element and a second element that is different from the first element, the substrate may have a first surface and a second surface that is different from the first surface, the first element and the second element may be disposed on the first surface of the substrate, a shortest distance between the solid state battery and the first surface may be shorter than a shortest distance between the solid state battery and the second surface, and the solid state battery may be disposed between the first element and the second element.

In the power unit according to the aspect, the power supply circuit may include a first element, the substrate may have a first surface and a second surface that is different from the first surface, the first element may be disposed on the first surface, and a shortest distance between the solid state battery and the second surface may be shorter than a shortest distance between the solid state battery and the first surface.

In the power unit according to the aspect, the first element may be a coil.

In the power unit according to the aspect, the charging circuit may be provided on the substrate.

The power unit according to the aspect may further include a switch circuit configured to switch between outputting the first direct voltage as the power source voltage and outputting the third direct voltage as the power source voltage.

DESCRIPTION OF EXEMPLARY EMBODIMENTS

Hereinafter, embodiments of the present disclosure will be described with reference to the attached drawings. The drawings are used for convenience in description. It is to be understood that the embodiments described below do not necessarily limit the scope of the disclosure described in the claims, and not all of the configurations and structures described in the embodiments are essential for the disclosure.

1. First Embodiment

A mobile device according to the first embodiment is a liquid discharge apparatus that discharges an ink as a liquid to a medium to form a desired image on the medium, and more particularly, a mobile ink jet printer that is powered by battery and thus portable. In the description below, the mobile ink jet printer may be simply referred to as a mobile printer. Media for image formation by the mobile printer include, for example, plain paper for printing of characters, images, and the like, glossy paper for printing of photos and the like, and postcards, but the media are not limited to these examples.

1.1 Functional Configuration of Mobile Printer

Figure 1:
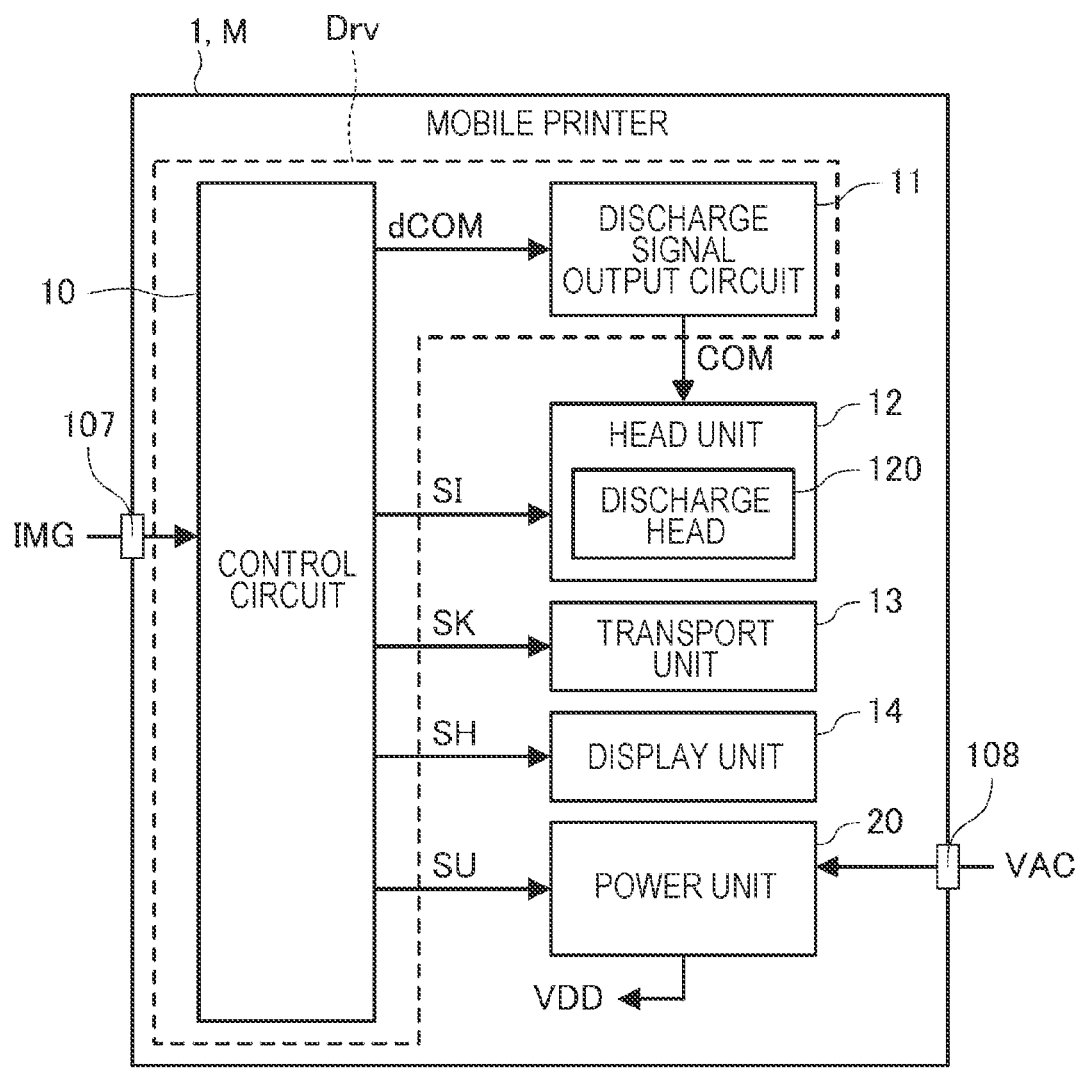
FIG. 1 illustrates an example functional configuration of a mobile printer.

FIG. 1 illustrates an example functional configuration of a mobile printer 1 as a mobile device M. As illustrated in FIG. 1, the mobile printer 1 includes a control circuit 10, a discharge signal output circuit 11, a head unit 12, a transport unit 13, a display unit 14, and a power unit 20.

The control circuit 10 generates control signals based on an image information signal IMG that is input through a terminal 107 from the outside of the mobile printer 1, and outputs the signals to corresponding components. With the configuration, control of operations of components in the mobile printer 1 is performed. The control circuit 10 includes, for example, a central processing unit (CPU). The control circuit 10 may include, instead of the CPU, or in addition to the CPU, at least one of a digital signal processor (DSP), an application specific integrated circuit (ASIC), a programmable logic device (PLD), and a field programmable gate array (FPGA).

More specifically, the control circuit 10 generates a waveform-defining signal dCOM that is a digital signal for defining a waveform of a discharge signal COM that is output from the discharge signal output circuit 11, and outputs the signal to the discharge signal output circuit 11. The discharge signal output circuit 11 converts the input waveform-defining signal dCOM into an analog signal, and performs class-D amplification to the analog signal to generate a discharge signal COM. The discharge signal COM generated in the discharge signal output circuit 11 is output to the head unit 12. The waveform-defining signal dCOM may be any signal for defining the waveform of the discharge signal COM, and may be an analog signal. The discharge signal output circuit 11 amplifies the waveform defined by the waveform-defining signal dCOM to a predetermined voltage, and may comprise a class-A amplifier circuit, a class-B amplifier circuit, a class-AB amplifier circuit, or the like.

The control circuit 10 generates a discharge control signal SI for controlling discharging of an ink from a discharge head 120 in the head unit 12, and outputs the discharge control signal SI to the head unit 12. More specifically, the discharge head 120 has nozzles (not illustrated) and drive elements (not illustrated) for discharging an ink from the nozzles. The drive element operates in accordance with the discharge signal COM that is input from the discharge signal output circuit 11. The discharge head 120 supplies the discharge signal COM to the drive elements at timing in accordance with the discharge control signal SI that is input from the control circuit 10. The discharge head 120 discharges the ink of an amount corresponding to the driving of the drive elements. By the operation, onto a medium on which an image is to be formed, a predetermined amount of ink is discharged at predetermined timing. That is, the discharge head 120 discharges the ink onto the medium in accordance with the discharge signal COM.

The control circuit 10 generates a transport control signal SK for controlling the transport unit 13, and outputs the transport control signal SK to the transport unit 13. The transport unit 13, in accordance with the input transport control signal SK, transports the medium in a predetermined transport direction. The ink is discharged from the discharge head 120 in synchronization with the transporting of the medium by the transport unit 13 in accordance with the transport control signal SK. By the operation, the ink is discharged at desired positions on the medium, and a desired image is formed on the medium.

The control circuit 10 generates a display control signal SH for controlling displaying of various kinds of information in a display unit 14, and outputs the display control signal SH to the display unit 14. In accordance with the display control signal SH, the display unit 14 displays various kinds of information such as operation information and status information about the mobile printer 1. By the operation, various kinds of information including the operation information and the status information of the mobile printer 1 are supplied to the user.

In addition, the control circuit 10 outputs a power supply control signal SU to the power unit 20 that outputs a power source voltage to the mobile printer 1. To the power unit 20, a voltage VAC, which is an alternating voltage as a commercial AC power supply, is input. In accordance with the input power supply control signal SU and voltage VAC, the power unit 20 outputs a voltage VDD that is a power source voltage for the mobile printer 1. That is, the power unit 20 supplies the voltage VDD as a power source voltage to the mobile printer 1 that includes a drive unit Drv. It should be noted that the power unit 20 may generate a plurality of voltages VDD are different voltages that correspond to individual components in the mobile printer 1 to which the voltages VDD are supplied, and output the voltages VDD to the corresponding components respectively. The configuration and operation of the power unit 20 will be described in detail below. The voltage VDD is an example output voltage to be output from the power unit 20.

In the mobile printer 1, which is an example mobile device M, that has the above-described structure, the discharge signal COM is an example drive signal. The mobile printer 1 includes the discharge signal output circuit 11 that outputs the discharge signal COM, or the discharge signal output circuit 11 and the control circuit 10. The drive unit Drv that outputs the discharge signal COM is an example drive signal output circuit. In the mobile printer 1, which is an example mobile device M, the head unit 12 that includes the discharge head 120 that discharges an ink as a liquid in accordance with the discharge signal COM is an example drive section.

The transport unit 13 operates in accordance with the transport control signal SK, and the display unit 14 operates in accordance with the display control signal SH. In other words, the transport control signal SK and the display control signal SH in the mobile device M operate the transport unit 13 and the display unit 14 respectively. The transport control signal SK and the display control signal SH are example other drive signals in the mobile device M, and the transport unit 13 that operates in accordance with the transport control signal SK and the display unit 14 that operates in accordance with the display control signal SH are other examples of the drive section in the mobile device M. In the mobile device M, the control circuit 10 that outputs the transport control signal SK and the display control signal SH is another example of the drive signal output circuit.

1.2 External and Internal Structures of Mobile Printer

Hereinafter, external and internal structures of the mobile printer 1 as the mobile device M will be described. With reference to FIG. 2 to FIG. 5, descriptions will be made by using an X axis, a Y axis, and a Z axis that are orthogonal to each other. On the X axis, a "−X side" may denote a base side of the arrow in the drawings and a "+X side" may denote a tip side of the arrow. A "+X direction" may denote a direction from its base side toward the tip side on the X axis, a "−X direction" may denote a direction from its tip side toward the base side on the X axis, and an "X-axis direction" may collectively denote the "−X direction" and the "+X direction". Similarly, on the Y axis, a "−Y side" may denote a base side of the arrow in the drawings and a "+Y side" may denote a tip side of the arrow. A "+Y direction" may denote a direction from its base side toward the tip side on the Y axis, a "−Y direction" may denote a direction from its tip side toward the base side on the Y axis, and a "Y-axis direction" may collectively denote the "−Y direction" and the "+Y direction". Similarly, on the Z axis, a "−Z side" may denote a base side of the arrow in the drawings and a "+Z side" may denote a tip side of the arrow. A "+Z direction" may denote a direction from its base side toward the tip side on the Z axis, a "−Z direction" may denote a direction from its tip side toward the base side on the Z axis, and a "Z-axis direction" may collectively denote the "−Z direction" and the "+Z direction". Although it is assumed that the X axis, the Y axis, and the Z axis are orthogonal to each other in the following description, the components of the mobile device M and the mobile printer 1 may not be orthogonal to each other.

Figure 2:
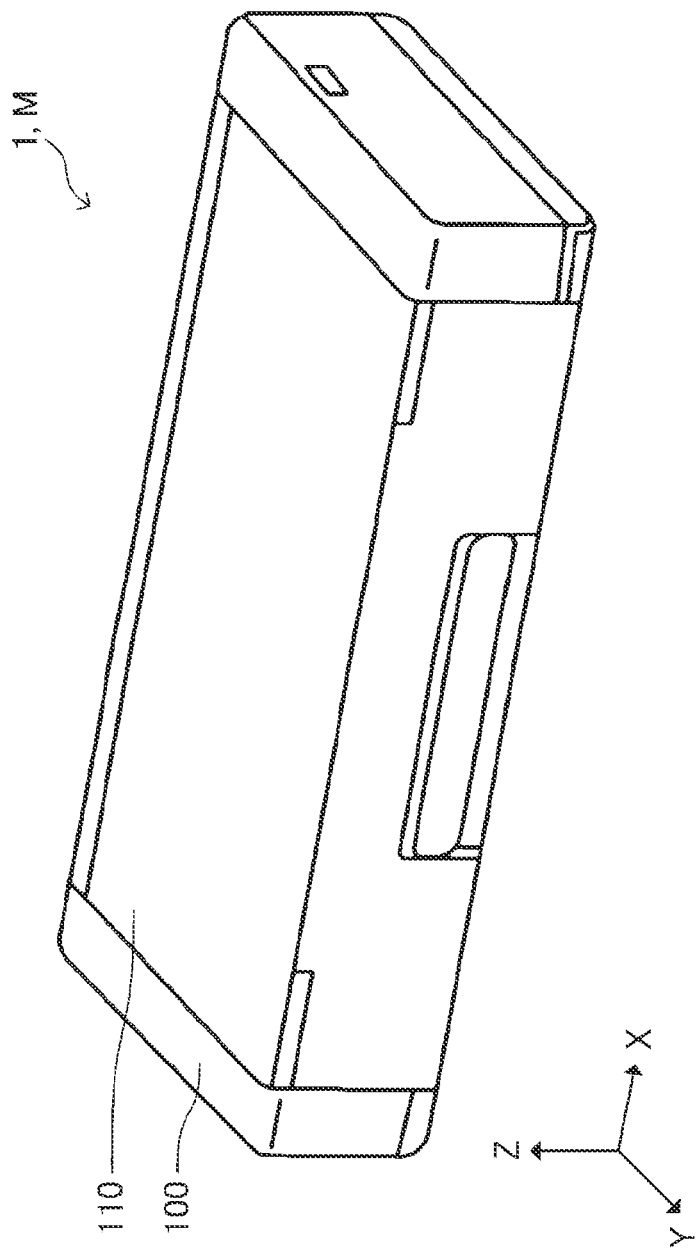
FIG. 2 illustrates the mobile printer viewed from a +Y side.
Figure 3:
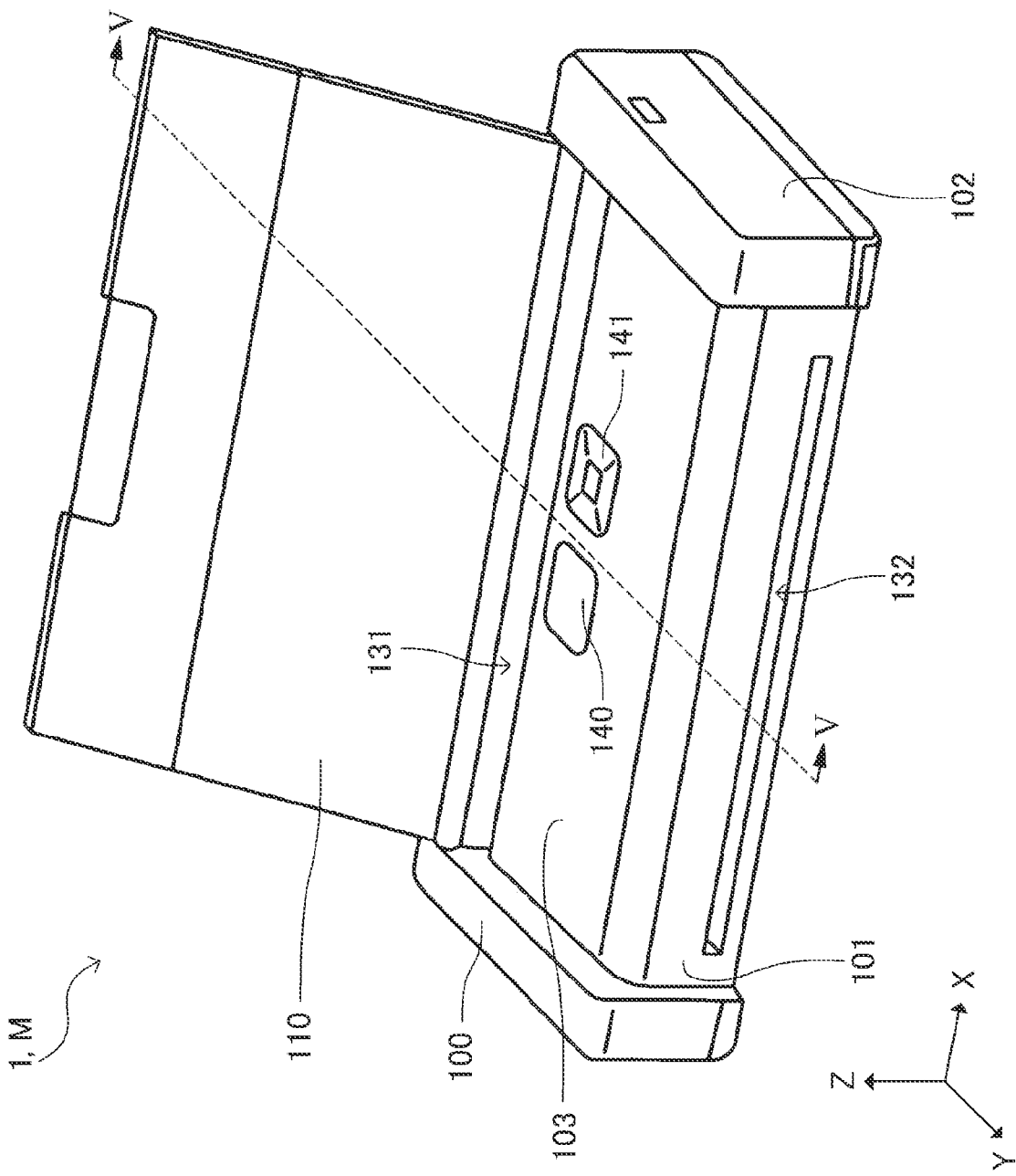
FIG. 3 illustrates the mobile printer with its cover being opened, the mobile printer viewed from the +Y side.
Figure 4:
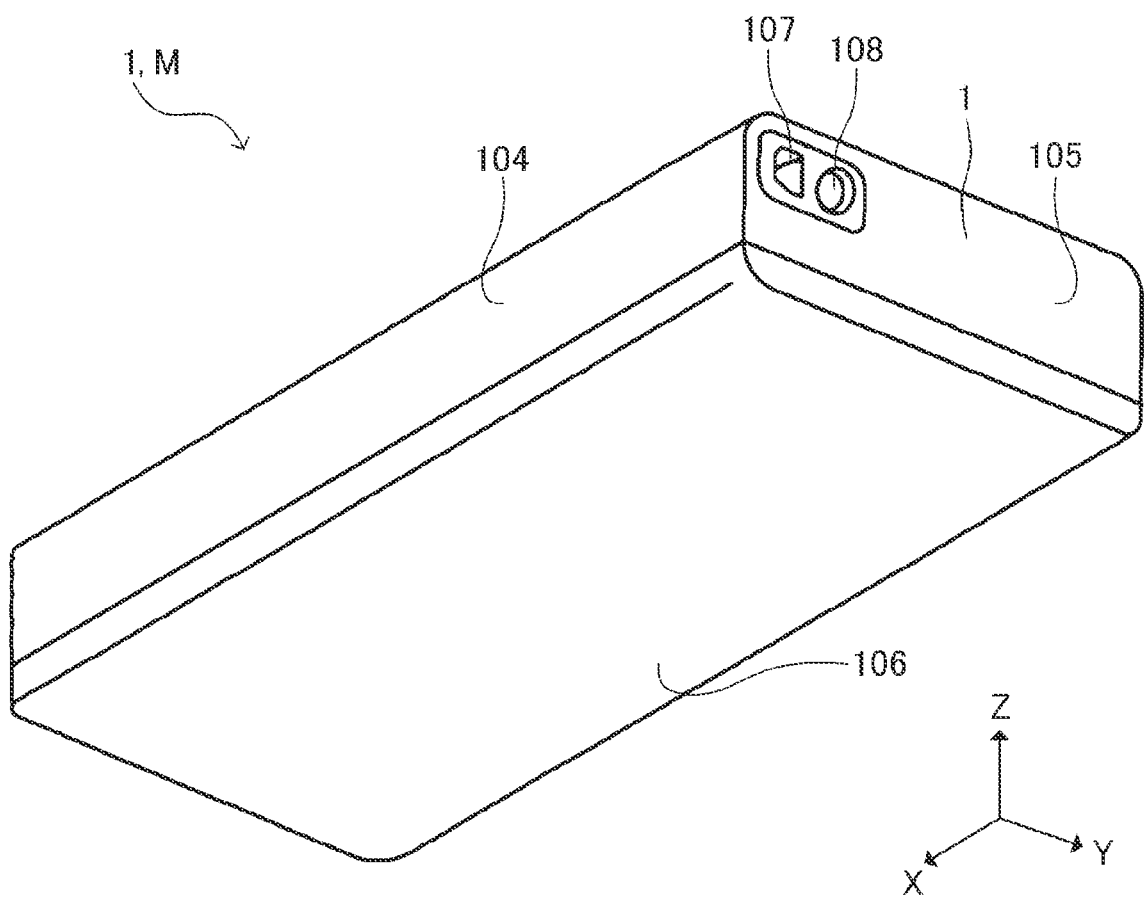
FIG. 4 illustrates the mobile printer viewed from a −Y side.

FIG. 2 illustrates the mobile printer 1 viewed from the +Y side. FIG. 3 illustrates the mobile printer 1 with a cover 110 that is opened, the mobile printer 1 viewed from the +Y side. FIG. 4 illustrates the mobile printer 1 viewed from the −Y side.

As illustrated in FIG. 2, the mobile printer 1 includes a housing 100 and the cover 110 that is openably and closably provided on the +Z side of the housing 100.

As illustrated in FIG. 3 and FIG. 4, the housing 100 has wall sections 101 to 106. The wall section 101 is disposed on the +Y side of the housing 100. The wall section 102 is disposed on the +X side of the housing 100. The wall section 103 is disposed on the +Z side of the housing 100. The wall section 104 is disposed on the −Y side of the housing 100. The wall section 105 is disposed on the −X side of the housing 100. The wall section 106 is disposed on the −Z side of the housing 100. More specifically, the wall section 101 and the wall section 104 face each other in the Y-axis direction, the wall section 102 and the wall section 105 face each other in the X-axis direction, and the wall section 103 and the wall section 106 face each other in the Z-axis direction. That is, the housing 100 in the mobile printer 1 is surrounded by the wall sections 101 to 106, and the housing 100 has a substantially rectangular parallelepiped shape with an internal space.

It is assumed that the mobile printer 1 according to the embodiment is used with the wall section 106 faced down. The wall section 106 of the housing 100 corresponds to a bottom section of the mobile printer 1, and the wall section 103 that faces the wall section 106 in the Z-axis direction corresponds to a top section of the mobile printer 1. The wall sections 101, 102, 104, and 105 of the housing 100 correspond to side walls of the mobile printer 1. In the description below, the wall section 106 that corresponds to the bottom section of the mobile printer 1 may be referred to as an installation surface of the mobile printer 1.

On the wall section 103 of the housing 100, a display panel 140 and an operation switch 141 are provided. In accordance with the display control signal SH, the display panel 140 displays various kinds of information based on an operation and a status of the mobile printer 1. The display panel 140 comprises a display panel such as a liquid crystal panel, an electronic paper panel, or an organic electroluminescence panel. The display panel 140 corresponds to the display unit 14 illustrated in FIG. 1. The operation switch 141 receives various user operations. In accordance with operations of the operation switch 141, the mobile printer 1 performs various kinds of processing. The wall section 103 may be provided with a touch panel that is a combination of the display panel 140 and an operation switch 141. In such a case, the touch panel that is the combination of the display panel 140 and the operation switch 141 corresponds to the display unit 14 illustrated in FIG. 1.

On the −Y side of the wall section 103, a supply slot 131 for supplying a medium into the housing 100 of the mobile printer 1 is provided. The wall section 101 has a discharge slot 132 for discharging a medium from the housing 100. A medium supplied from the supply slot 131 into the housing 100 is transported by the transport unit 13 illustrated in FIG. 1 toward the discharge slot 132. In synchronization with the transporting of the medium, an ink is discharged from the head unit 12 that is accommodated in the housing 100. By the operation, the medium with a desired image formed thereon is discharged from the discharge slot 132.

As illustrated in FIG. 4, the wall section 105 is provided with the terminal 107 to which an image information signal IMG is input, and a terminal 108 to which a voltage VAC is supplied. The terminal 107 is, for example, a universal serial bus (USB) port to which a USB cable that is communicably coupled to an external device, such as a personal computer or a digital camera, is coupled. The terminal 108 is, for example, an inlet socket to which a voltage VAC that is a commercial AC power supply is input.

The terminal 107 is not limited to the USB port, and may be, for example, a printer port. The image information signal IMG may be supplied to the mobile printer 1 by wireless communication. In such a case, the mobile printer 1 may include, instead of the terminal 107, at least one of a receiver and a transmitter for the wireless communication.

Figure 5:
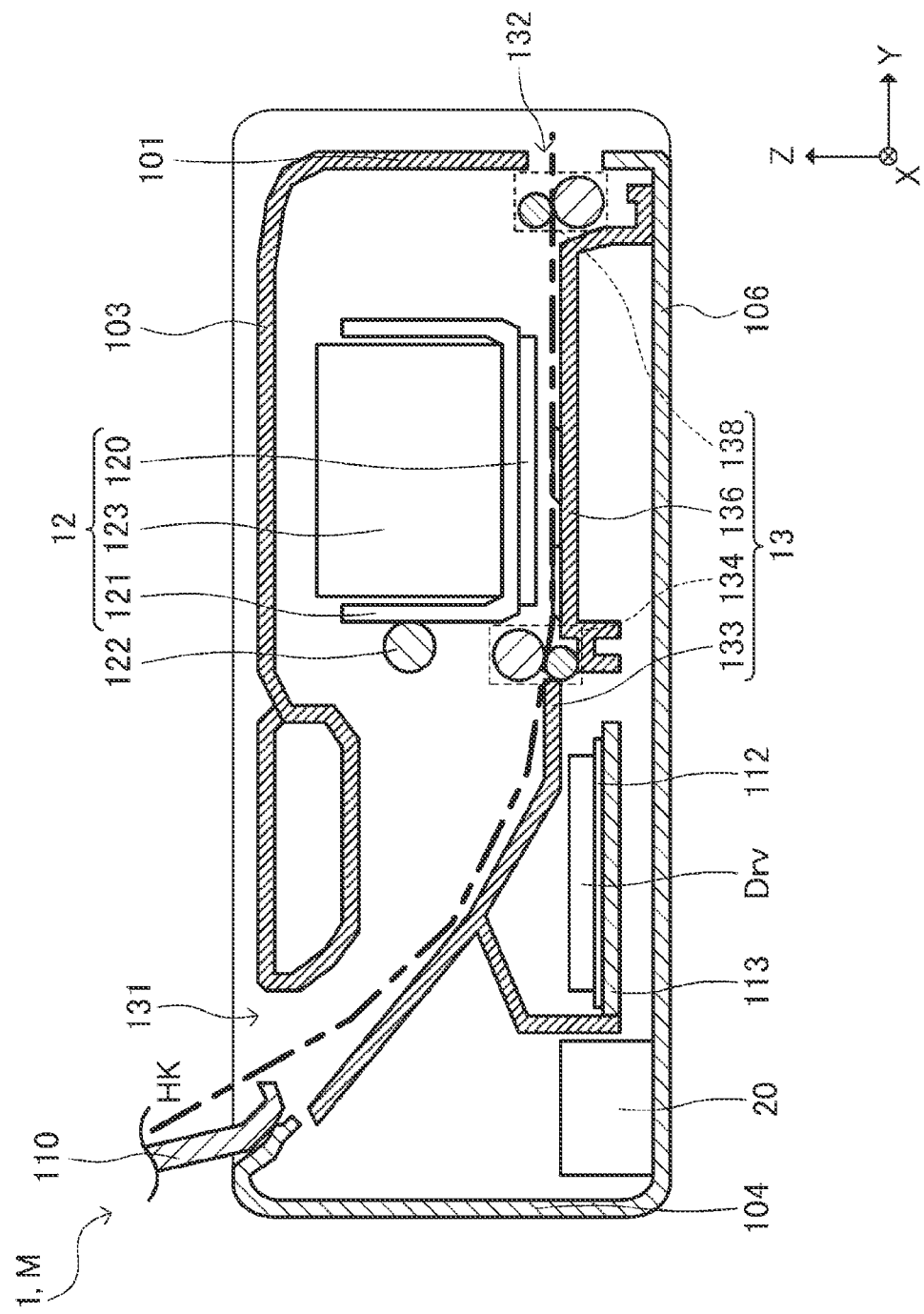
FIG. 5 illustrates a cross-sectional structure of the mobile printer taken along line V-V in FIG. 3.

Hereinafter, an internal structure of the mobile printer 1 will be described. FIG. 5 illustrates a cross-sectional structure of the mobile printer 1 taken along line V-V in FIG. 3.

In FIG. 5, as an example of the mobile printer 1, a serial ink jet printer will be described. The discharge head 120 that is mounted to a carriage 121 discharges an ink while the carriage 121 in the head unit 12 in the mobile printer 1 reciprocates in the X-axis direction, and thereby an image is formed on a medium.

As illustrated in FIG. 5, the mobile printer 1 includes the head unit 12, the transport unit 13, a circuit board 112, and the power unit 20.

The head unit 12 includes the discharge head 120, the carriage 121, and a liquid storage section 123. The carriage 121 is supported, on the −Y side, by a carriage guiding shaft 122 such that the carriage 121 can reciprocate. With the carriage 121 supported by the carriage guiding shaft 122, the carriage 121 reciprocates in the X-axis direction.

The discharge head 120 is attached to the −Z side of the carriage 121. The liquid storage section 123 that stores an ink to be discharged from the discharge head 120 is mounted on the +Z side of the carriage 121. The liquid storage section 123 and the discharge head 120 are coupled by a liquid flow channel (not illustrated). The ink stored in the liquid storage section 123 is supplied through the liquid flow channel (not illustrated) to the discharge head 120. The discharge head 120 discharges the supplied ink in accordance with a discharge signal COM and a discharge control signal SI.

The transport unit 13 includes a medium support section 133, a transport roller pair 134, a medium support section 136, and a transport roller pair 138. The medium support section 133 and the medium support section 136 serve as a transport path HK for transporting a medium supplied from the supply slot 131 to the discharge slot 132. The transport unit 13, accordingly, transports a medium from the supply slot 131 toward the discharge slot 132.

More specifically, a medium supplied from the supply slot 131 is transported from the medium support section 133 toward the medium support section 136 as the transport roller pair 134 operates. The medium support section 136 is disposed on the −Z side of the discharge head 120 that is mounted to the carriage 121. The medium support section 136, accordingly, faces the discharge head 120 that is mounted to the carriage 121 in the Z-axis direction. In a state in which a medium that is transported along the transport path HK is supported by the medium support section 136, an ink is discharged from the discharge head 120. By the operation, the ink is discharged onto the medium, and an image is formed on the medium.

The mobile printer 1 includes transport roller pairs 134 and 138, and a drive motor (not illustrated) for driving the carriage 121. The control circuit 10 controls the drive motor (not illustrated) in accordance with a transport control signal SK to control the operation of the transport roller pairs 134 and 138 and the carriage 121. By the operation, the medium transportation along the transport path HK and the movement of the carriage 121 with the discharge head 120 mounted thereon can be controlled. Under the control, predetermined amounts of ink are discharged at desired positions on a medium, and a desired image is formed on the medium.

On the −Z side of the transport path HK, the circuit board 112 and a board support section 113 are disposed. The housing 100 of the mobile printer 1, accordingly, also accommodates the board support section 113. On the +Z side of the circuit board 112, various circuits are mounted to configure the drive unit Drv.

The circuit board 112 is mounted to the board support section 113 that is provided on the −Z side of the circuit board 112. The board support section 113, accordingly, supports the circuit board 112 and the drive unit Drv that is mounted on the circuit board 112. The circuit board 112 is, for example, screwed to the board support section 113, and thereby the circuit board 112 is supported by the board support section 113. In such a case, the circuit board 112 may be fixed to the board support section 113 so as not to cause electrical contact between the circuit board 112 and the board support section 113. For example, the circuit board 112 may be fixed to the board support section 113 with an insulator (not illustrated) provided between the circuit board 112 and the board support section 113. Alternatively, the circuit board 112 may be fixed to the board support section 113 with a spacer for forming a space between the circuit board 112 and the board support section 113.

The power unit 20 is disposed on the −Z side of the transport path HK and the −Y side of the board support section 113. The power unit 20 is fixed to the wall section 106 with a fixing member such as a screw, an engagement member, or the like. The power unit 20 is fixed to the wall section 106, however, may be fixed to the wall section 104, the medium support section 133, a frame (not illustrated) of the mobile printer 1, or other sections.

As described above, the mobile printer 1 that is an example mobile device M according to the embodiment includes the circuit board 112 with the drive unit Drv mounted thereon to output a discharge signal COM, the head unit 12 that includes the discharge head 120 for discharging an ink in accordance with the discharge signal COM, the power unit 20 for supplying a voltage VDD to the drive unit Drv, and the housing 100 that accommodates the drive unit Drv, the head unit 12, and the power unit 20. It should be noted that the housing 100 is an example first housing.

1. 3 Configuration of Power Unit
1. 3. 1 Electrical Configuration of Power Unit

Figure 6:
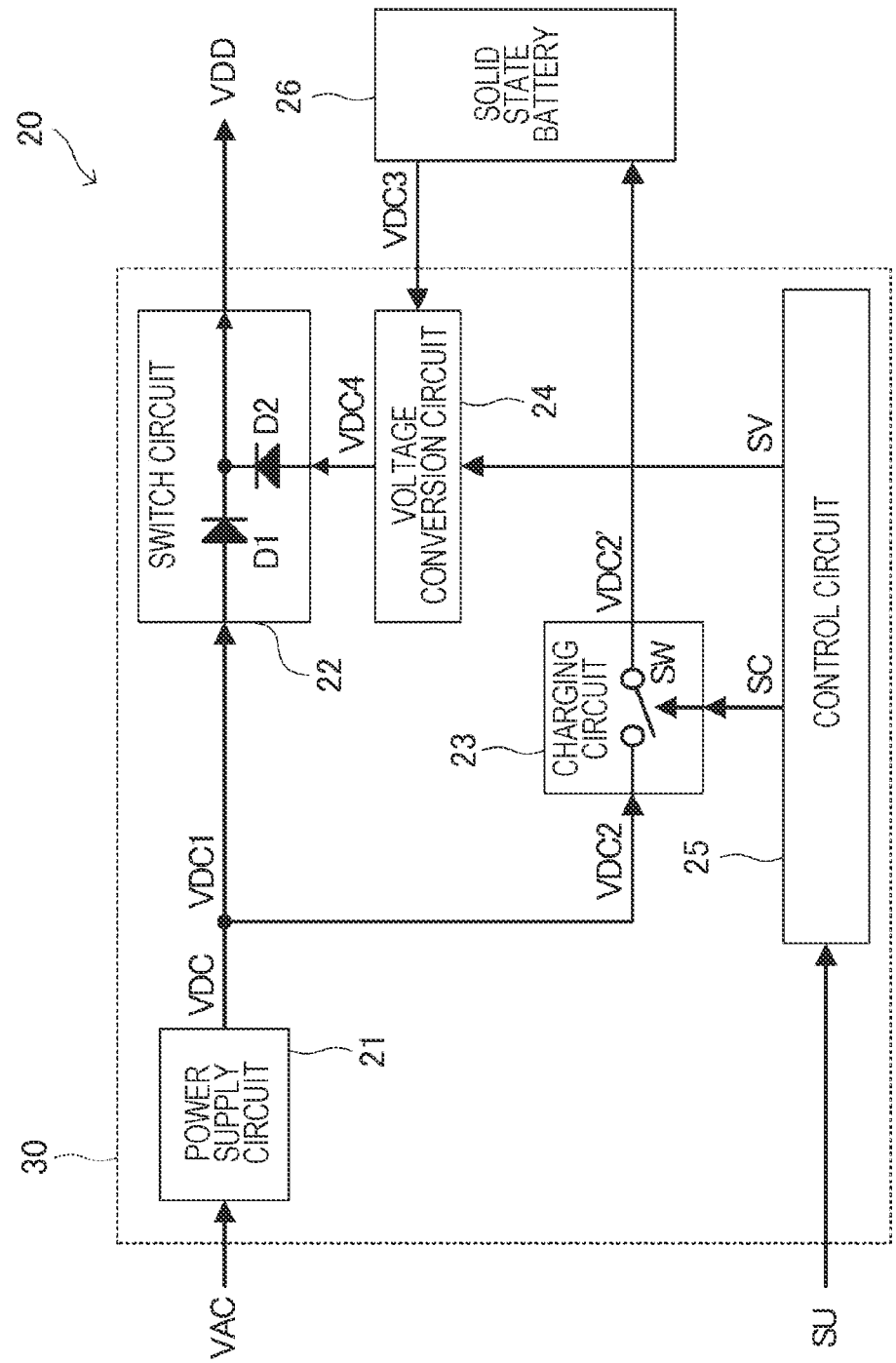
FIG. 6 illustrates an electrical configuration of a power unit.
Figure 7:
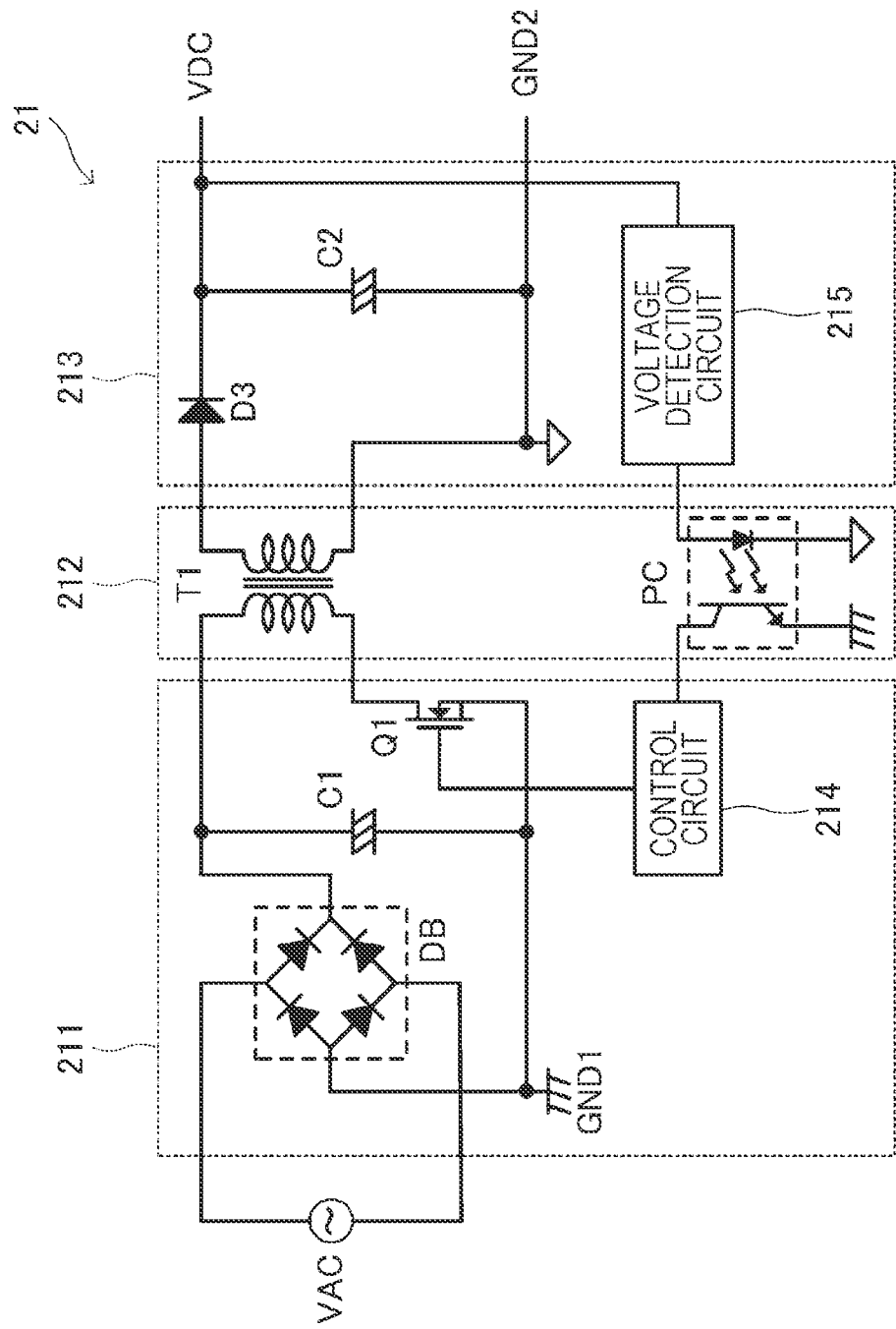
FIG. 7 illustrates a configuration of a power supply circuit in the power unit.

With reference to FIG. 6 and FIG. 7, an electrical configuration of the power unit 20 will be described. FIG. 6 illustrates an electrical configuration of the power unit 20. FIG. 7 illustrates a circuit configuration of the power supply circuit 21 in the power unit 20. As illustrated in FIG. 6, the power unit 20 includes the power supply circuit 21, a switch circuit 22, a charging circuit 23, a voltage conversion circuit 24, a control circuit 25, and a solid state battery 26.

The power supply circuit 21 converts a voltage VAC into a voltage VDC that is a direct voltage and outputs the voltage VDC. The voltage VDC that is output from the power supply circuit 21 is divided in the power unit 20. One of the divided voltages VDC is input as a voltage VDC1 to the switch circuit 22. The other one of the divided voltages VDC is input as a voltage VDC2 to the charging circuit 23. To the power supply circuit 21, accordingly, a voltage VAC, which is an alternating voltage as a commercial AC power supply, is input. The power supply circuit 21 converts the voltage VAC into a voltage VDC1 and a voltage VDC2, which are direct voltages, and outputs the voltage VDC1 and the voltage VDC2.

Of the voltages VDC that are output from the power supply circuit 21, the voltage VDC1 is an example first direct voltage, and the voltage VDC2 is an example second direct voltage. In FIG. 6, the power supply circuit 21 divides the voltage VDC to be output, and one of the divided voltages is the voltage VDC1 and the other one is the voltage VDC2; however, the power supply circuit 21 may output two direct voltages of the voltage VDC1 and the voltage VDC2. In other words, the power supply circuit 21 may output direct voltages of a plurality of voltage values including the voltage VDC1 and the voltage VDC2.

With reference to FIG. 7, a circuit configuration of the power supply circuit 21 will be described. FIG. 7 illustrates a specific circuit configuration of the power supply circuit 21. As illustrated in FIG. 7, the power supply circuit 21 includes a diode bridge DB, capacitors C1 and C2, a transistor Q1, a transformer T1, a diode D3, a control circuit 214, and a voltage detection circuit 215.

A voltage VAC is supplied to an input terminal of the diode bridge DB. A high-potential output terminal of the diode bridge DB is electrically coupled to one terminal of the capacitor C1 and to one terminal of a primary winding of the transformer T1. The other terminal of the primary winding of the transformer T1 is electrically coupled to a drain of the transistor Q1. To a gate of the transistor Q1, a gate signal Vgd that is output from the control circuit 214 is input. The control circuit 214 is coupled to a collector of an output transistor of a photocoupler PC. A ground potential GND1 is supplied to the other terminal of the capacitor C1, a source of the transistor Q1, and an emitter of the output transistor of the photocoupler PC.

One terminal of a secondary winding of the transformer T1 is coupled to an anode of the diode D3. A cathode of the diode D3 is coupled to a terminal of the capacitor C2, and from a contact point of the cathode of the diode D3 and the terminal of the capacitor C2, a voltage VDD is output. To the voltage detection circuit 215, the voltage VDD is input. The voltage detection circuit 215 is coupled to an anode of an input diode of the photocoupler PC. A ground potential GND2 is input to the other terminal of the secondary winding of the transformer T1, the other terminal of the capacitor C2, and a cathode of the input diode of the photocoupler PC.

As described above, the power supply circuit 21 according to the embodiment is a flyback circuit. In the flyback circuit, a primary circuit 211 denotes a primary circuit to which the voltage VAC is input and includes the diode bridge DB, the capacitor C1, the transistor Q1, and the control circuit 214. In the flyback circuit, a secondary circuit 213 denotes a secondary circuit that smooths a voltage output from the transformer T1 and outputs the voltage as the voltage VDD, and includes the diode D3, the capacitor C2, and the voltage detection circuit 215. Furthermore, an isolation circuit 212 denotes a circuit that isolates between the primary circuit 211 and the secondary circuit 213, and includes the transformer T1 that transmits a signal between the primary circuit 211 and the secondary circuit 213, and the photocoupler PC. The transformer T1 in the isolation circuit 212 is an example coil.

The power supply circuit 21 is not limited to the above-described flyback circuit, and may be any circuit that converts a voltage VAC that is a commercial AC power supply into a voltage VDC that is a predetermined direct voltage, and various AC/DC converter circuits may be used. In such a case, to increase the safety of the voltage VDC, the power supply circuit 21 may be an isolation circuit like the above-described flyback circuit.

Returning to FIG. 6, the charging circuit 23 includes a switch circuit SW. One terminal of the switch circuit SW is electrically coupled to the power supply circuit 21. To one terminal of the switch circuit SW, accordingly, the voltage VDC2 is supplied. The other terminal of the switch circuit SW is electrically coupled to the solid state battery 26. To a control terminal of the switch circuit SW, a charge control signal SC that is output from the control circuit 25 is input.

The switch circuit SW switches between conduction and non-conduction between the one terminal and the other terminal of the switch circuit SW in accordance with the charge control signal SC that is input from the control circuit 25. The charging circuit 23 thus switches, in accordance with the charge control signal SC, supplying or not supplying a voltage VDC2' based on a voltage VDC2 to the solid state battery 26.

The solid state battery 26 is a secondary battery that can be charged with the voltage VDC2' output from the charging circuit 23. More specifically, the solid state battery 26 is an all-solid-state battery that includes an inorganic solid material containing ceramic or the like as an electrolyte. The solid state battery 26 generates a voltage VDC3 corresponding to an electrical charge stored with the voltage VDC2', and outputs the voltage VDC3 to the voltage conversion circuit 24.

The charging circuit 23, accordingly, stores an electrical charge in the solid state battery 26 with the voltage VDC2', and the solid state battery 26 outputs the voltage VDC3 corresponding to the stored electrical charge. The voltage VDC3 is an example third direct voltage.

The voltage conversion circuit 24, in accordance with a voltage control signal SV that is input from the control circuit 25, increases or decreases a voltage value of the voltage VDC3 that is output from the solid state battery 26, and outputs the voltage as a voltage VDC4 to the switch circuit 22. With the configuration, based on a voltage VDC3 that is output from the solid state battery 26, a voltage value of a direct voltage that is output from the power unit 20 can be appropriately changed depending on the specifications of the mobile device M, or the mobile printer 1. Accordingly, the versatility of the power unit 20 that is provided in the mobile device M, or the mobile printer 1, can be increased. It should be noted that the power unit 20 may not include the voltage conversion circuit 24. In such a case, the voltage VDC3 is supplied to the switch circuit 22.

The voltage conversion circuit 24 only increases or decreases the voltage VDC3 that is output from the solid state battery 26 and outputs the voltage, and in a broad sense, the voltage VDC4 that is output from the voltage conversion circuit 24 is also a direct voltage corresponding to the electric charge that is stored in the solid state battery 26. Consequently, the voltage VDC4 based on the voltage VDC3 that is output from the solid state battery 26 is also an example third direct voltage.

The switch circuit 22 includes a diode D1 and a diode D2. To an anode of the diode D1, a voltage VDC1 that is output from the power supply circuit 21 is input. To an anode of the diode D2, a voltage VDC4 that is output from the voltage conversion circuit 24 is input. A cathode of the diode D1 and a cathode of the diode D2 are commonly coupled. The switch circuit 22 outputs a voltage VDD from a contact point of the commonly coupled cathode of the diode D1 and the cathode of the diode D2. The switch circuit 22 outputs, as the voltage VDD, a direct voltage that has a higher voltage value between a voltage value of the voltage VDC1 and a voltage value of the voltage VDC4. Accordingly, the switch circuit 22, based on a voltage value of the voltage VDC1 and a voltage value of the voltage VDC4, switches between outputting the voltage VDC1 as the voltage VDD and outputting the voltage VDC4 as the voltage VDD.

It should be noted that the power unit 20 may not include the switch circuit 22 and may include an output terminal for outputting the voltage VDD based on the voltage VDC1 that is generated from the voltage VAC that is a commercial AC power supply, and an output terminal for outputting the voltage VDD based on the voltage VDC3 that is generated based on the electric charge that is stored in the solid state battery 26. However, the switch circuit 22 may switch between outputting, as the voltage VDD, the voltage VDC1 that is generated from the voltage VAC that is a commercial AC power supply, and outputting, as the voltage VDD, the voltage VDC4 based on the voltage VDC3 that is generated based on the electric charge that is stored in the solid state battery 26. In this configuration, in the power unit 20, it is not necessary to separately provide the output terminal for outputting the voltage VDD based on the voltage VDC1 and the output terminal for outputting the voltage VDD based on the voltage VDC3. As a result, the size of the power unit 20 can be reduced.

It should be noted that the switch circuit 22 is not limited to the one that has the configuration illustrated in FIG. 6, and the switch circuit 22 may switch, in accordance with a switch control signal (not illustrated) that is input from the control circuit 25, between outputting the voltage VDC1 as the voltage VDD or outputting the voltage VDC4 based on the voltage VDC3 as the voltage VDD.

As described above, the power unit 20 according to the embodiment outputs, as the voltage VDD, at least one of the voltage VDC1 that is generated in the power supply circuit 21, and the voltage VDC3 and the voltage VDC4 that are generated based on the electric charge that is stored in the solid state battery 26 to the components in the mobile device M that includes the drive unit Drv, or the mobile printer 1.

In FIG. 6, the charge control signal SC that controls the charging circuit 23 and the voltage control signal SV are output from the control circuit 25 in the power unit 20; however, the charge control signal SC and the voltage control signal SV may be input as power supply control signals SU from the control circuit 10. In such a case, the power unit 20 may not include the control circuit 25.

1. 3. 2 Example Layout of Circuits on Substrate in Power Unit

Figure 8:
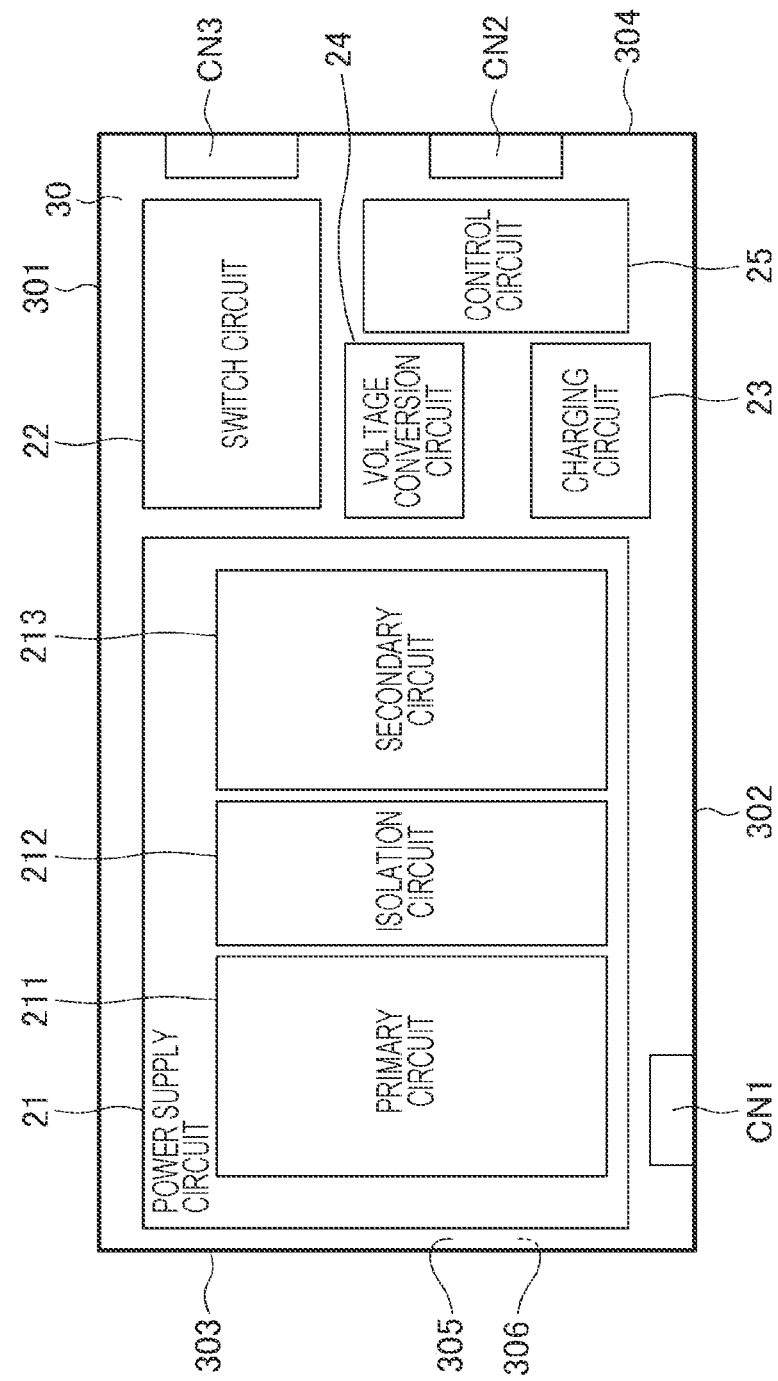
FIG. 8 illustrates a layout of circuits on a substrate.

As illustrated in FIG. 6, the power supply circuit 21, the switch circuit 22, the charging circuit 23, the voltage conversion circuit 24, and the control circuit 25, which are included in the power unit 20, are mounted on the substrate 30. In other words, the power unit 20 includes the substrate 30, and on the substrate 30, the power supply circuit 21, the switch circuit 22, the charging circuit 23, the voltage conversion circuit 24, and the control circuit 25 are mounted. An example layout of the power supply circuit 21, the switch circuit 22, the charging circuit 23, the voltage conversion circuit 24, and the control circuit 25 on the substrate 30 in the power unit 20 will be described with reference to FIG. 8. FIG. 8 illustrates a layout of the circuits on the substrate 30.

As illustrated in FIG. 8, the substrate 30 has a substantially rectangular shape and has a side 301, a side 302 that faces the side 301, a side 303 that intersects the side 301 and the side 302, and a side 304 that faces the side 303. The substrate 30 has a surface 305, and a surface 306 that is a surface different from the surface 305 and faces the surface 305. In FIG. 8, although the substrate 30 has a substantially rectangular shape and has the side 301, the side 302, the side 303, and the side 304 that are orthogonal to each other, a part of the substrate 30 may be an arc, a notch, or the like, and the substrate 30 may be a polygon such as a pentagon or a hexagon.

The power supply circuit 21 is disposed on the side 303 side on the surface 305 of the substrate 30, and from the side 303 toward the side 304, a primary circuit 211, an isolation circuit 212, and a secondary circuit 213 are arranged side by side in this order. The switch circuit 22 is disposed on the side 304 side of the power supply circuit 21 on the surface 305 of the substrate 30. The voltage conversion circuit 24 is disposed on the side 304 side of the power supply circuit 21 and on the side 302 side of the switch circuit 22 on the surface 305 of the substrate 30. The charging circuit 23 is disposed on the side 304 side of the power supply circuit 21 and on the side 302 side of the voltage conversion circuit 24 on the surface 305 of the substrate 30. The control circuit 25 is disposed on the side 302 side of the switch circuit 22 and on the side 304 side of the voltage conversion circuit 24 and the charging circuit 23 on the surface 305 of the substrate 30.

On the surface 305 of the substrate 30, connectors CN1, CN2, and CN3 are provided. The connector CN1 is an input connector for supplying the voltage VAC to the power unit 20, and is disposed on the side 302 side of the primary circuit 211 in the power supply circuit 21. This arrangement enables to shorten the length of a wire that carries the voltage VAC. The connector CN2 is an input connector to which a power supply control signal SU that is output from the control circuit 10 is input. The connector CN2 is disposed on the side 304 side of the control circuit 25. This arrangement enables to shorten the length of a wire that carries the voltage VDD to the control circuit 25. The connector CN3 is an output connector for outputting a voltage VDD that is output from the switch circuit 22. The connector CN3 is disposed on the side 304 side of the switch circuit 22, and on the side 301 side of the connector CN2. This arrangement enables to shorten the length of a wire that carries the voltage VDD that is output from the switch circuit 22.

In the substrate 30, the surface 305 on which the power supply circuit 21, the switch circuit 22, the charging circuit 23, the voltage conversion circuit 24, and the control circuit 25 are mounted is an example first surface, and in the substrate 30, the surface 306 that is different from the surface 305 is an example second surface.

1. 3. 3 External and Internal Structures of Power Unit

With reference to FIG. 9 to FIG. 12, external and internal structures of the power unit 20 will be described. In the description with reference to FIG. 9 to FIG. 12, descriptions will be made by using a P axis, a Q axis, and an R axis that are orthogonal to each other. On the P axis, a "−P side" may denote a base side of the arrow in the drawings and a "+P side" may denote a tip side of the arrow. A "+P direction" may denote a direction from its base side toward the tip side on the P axis, a "−P direction" may denote a direction from its tip side toward the base side on the P axis, and a "P-axis direction" may collectively denote the "−P direction" and the "+P direction". Similarly, on the Q axis, a "−Q side" may denote a base side of the arrow in the drawings and a "+Q side" denotes a tip side of the arrow. A "+Q direction" may denote a direction from its base side toward the tip side on the Z axis, a "−Q direction" may denote a direction from its tip side toward the base side on the Q axis, and a "Q-axis direction" may collectively denote the "−Q direction" and the "+Q direction". Similarly, on the R axis, a "−R side" may denote a base side of the arrow in the drawings and a "+R side" denotes a tip side of the arrow. A "+R direction" may denote a direction from its base side toward the tip side on the Z axis, a "−R direction" may denote a direction from its tip side toward the base side on the R axis, and a "R-axis direction" may collectively denote the "−R direction" and the "+R direction". Although it is assumed that the P axis, the Q axis, and the R axis are orthogonal to each other in the following description, the components of the power unit 20 may not be orthogonal to each other. In addition, the P axis, the Q axis, and the R axis may denote directions that are independent from the X axis, the Y axis, and the Z axis respectively illustrated in FIG. 2 to FIG. 5, or the P axis, the Q axis, and the R axis may have correlations with the X axis, the Y axis, and the Z axis respectively illustrated in FIG. 2 to FIG. 5.

As illustrated in FIG. 9 to FIG. 12, the power unit 20 includes the power supply circuit 21, the switch circuit 22, the charging circuit 23, the voltage conversion circuit 24, the control circuit 25, the substrate 30 with the connectors CN1 to CN3 mounted thereon, the solid state battery 26, and a housing 200. The housing 200 accommodates the power supply circuit 21, the switch circuit 22, the charging circuit 23, the voltage conversion circuit 24, the control circuit 25, the substrate 30 with the connectors CN1 to CN3 mounted thereon, and the solid state battery 26. The housing 200 is an example second housing.

Figure 9:
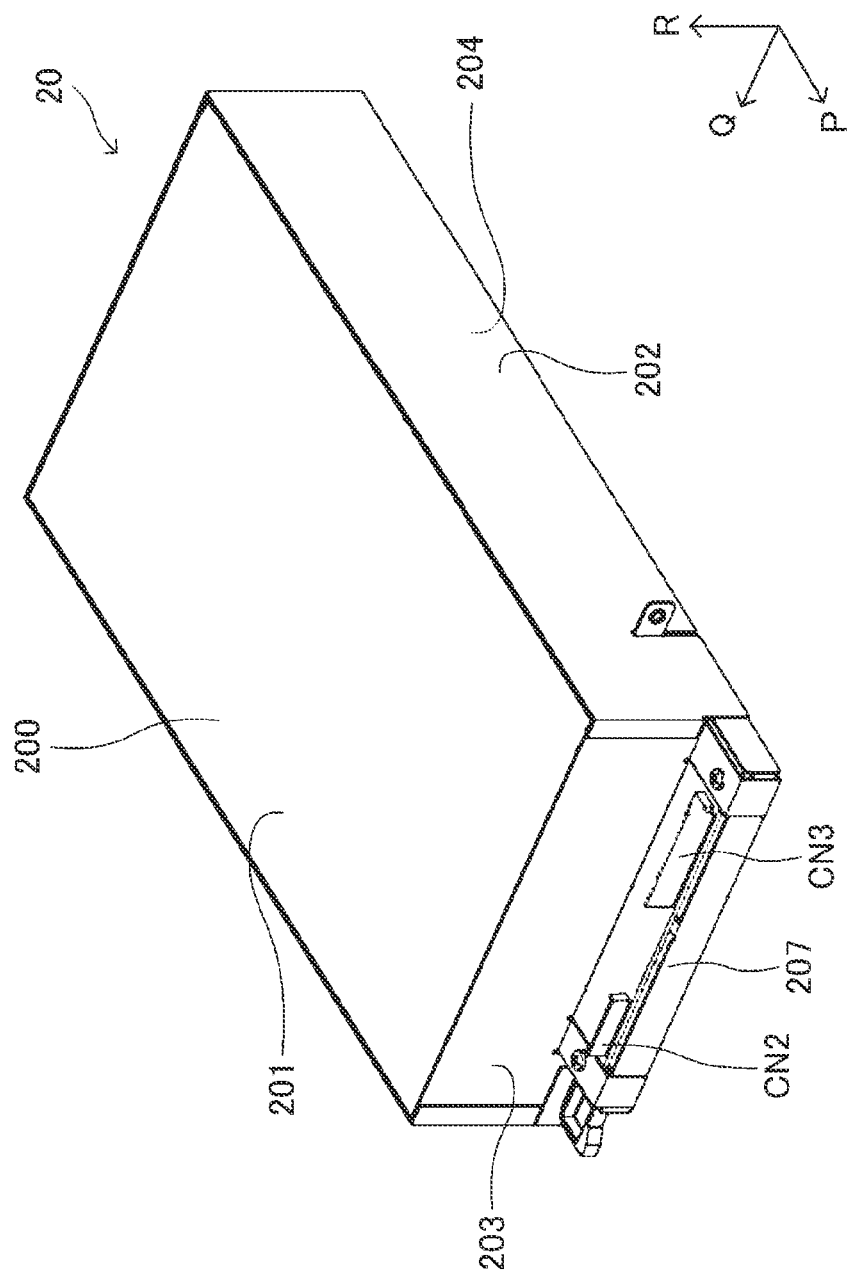
FIG. 9 illustrates the power unit viewed from a +P side.
Figure 10:
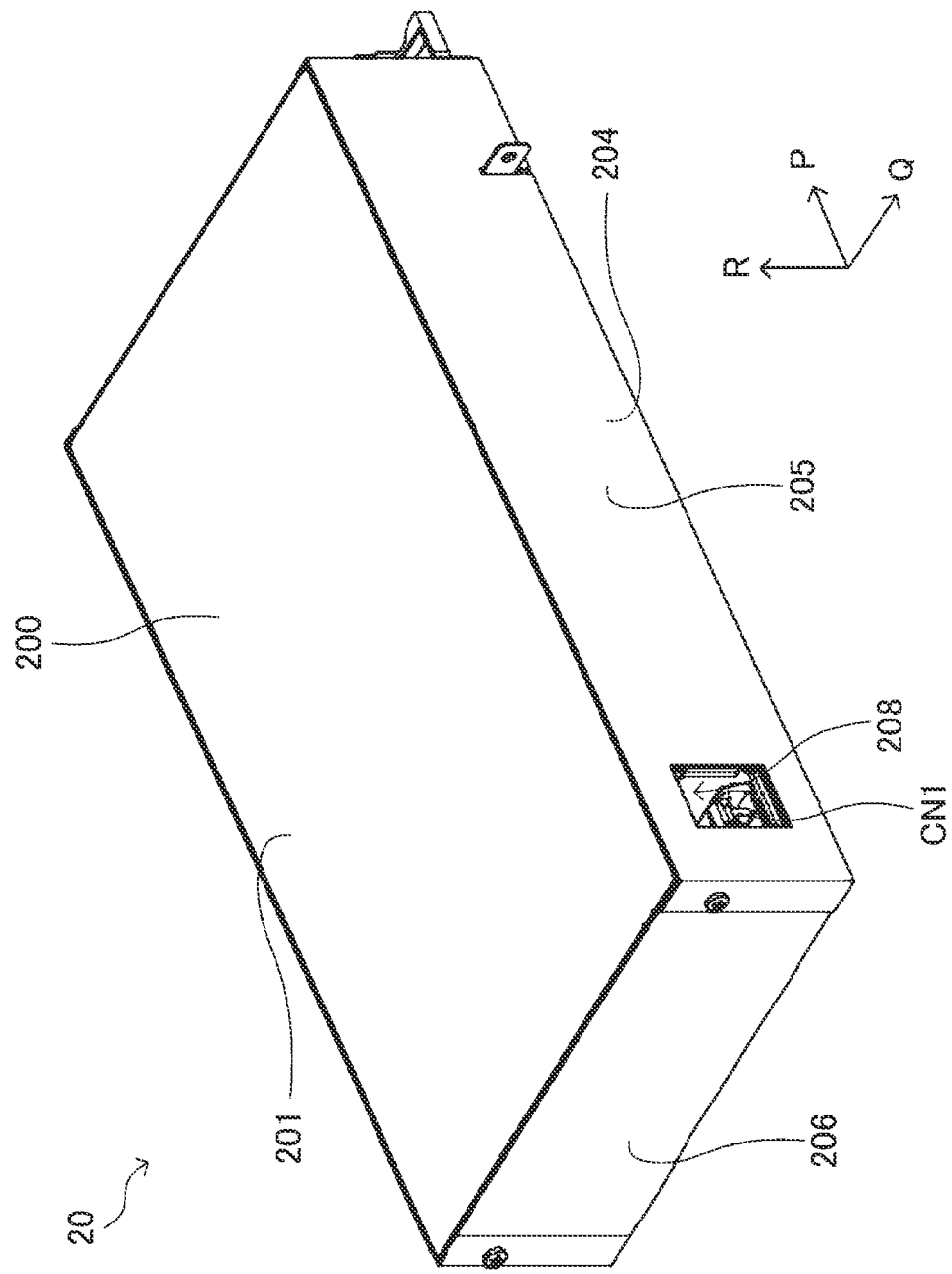
FIG. 10 illustrates the power unit viewed from a −P side.

With reference to FIG. 9 and FIG. 10, an external structure of the power unit 20 will be described. FIG. 9 illustrates the power unit 20 viewed from the +P side. FIG. 10 illustrates the power unit 20 viewed from the −P side.

As illustrated in FIG. 9 and FIG. 10, the housing 200 has wall sections 201 to 206. The wall section 201 is disposed on the +R side of the housing 200. The wall section 202 is disposed on the −Q side of the housing 200. The wall section 203 is disposed on the +P side of the housing 200. The wall section 204 is disposed on the −R side of the housing 200. The wall section 205 is disposed on the +Q side of the housing 200. The wall section 206 is disposed on the −P side of the housing 200. More specifically, the wall section 201 and the wall section 204 face each other in the R-axis direction, the wall section 202 and the wall section 205 face each other in the Q-axis direction, and the wall section 203 and the wall section 206 face each other in the P-axis direction. That is, the power unit 20 is surrounded by the wall sections 201 to 206, and the housing 200 has a substantially rectangular parallelepiped shape with an internal space.

The wall section 203 has a protrusion 207 on the +P side of the wall section 203 of the housing 200. On the protrusion 207, the connectors CN2 and CN3 that are mounted on the substrate 30 that is accommodated in the housing 200 are exposed from the housing 200. The wall section 205 of the housing 200 has an opening 208. Inside the opening 208, the connector CN1 mounted on the substrate 30 that is accommodated in the housing 200 is disposed. More specifically, in the housing 200, the connector CN1 on the substrate 30 is arranged in the opening 208, and the connectors CN2 and CN3 on the substrate 30 are exposed on the protrusion 207.

Figure 11:
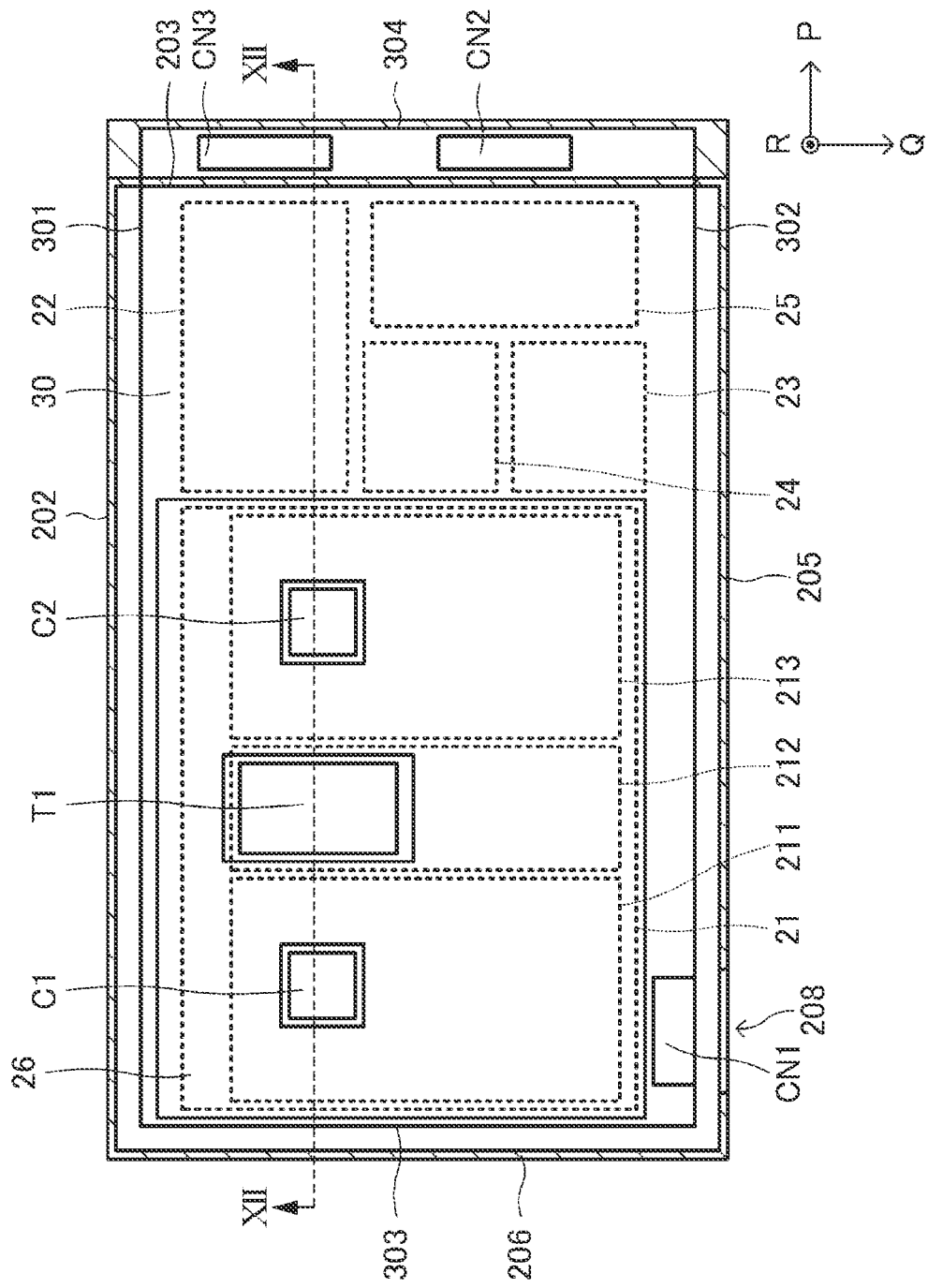
FIG. 11 illustrates an internal structure of a housing of the power unit viewed from a +R side.
Figure 12:
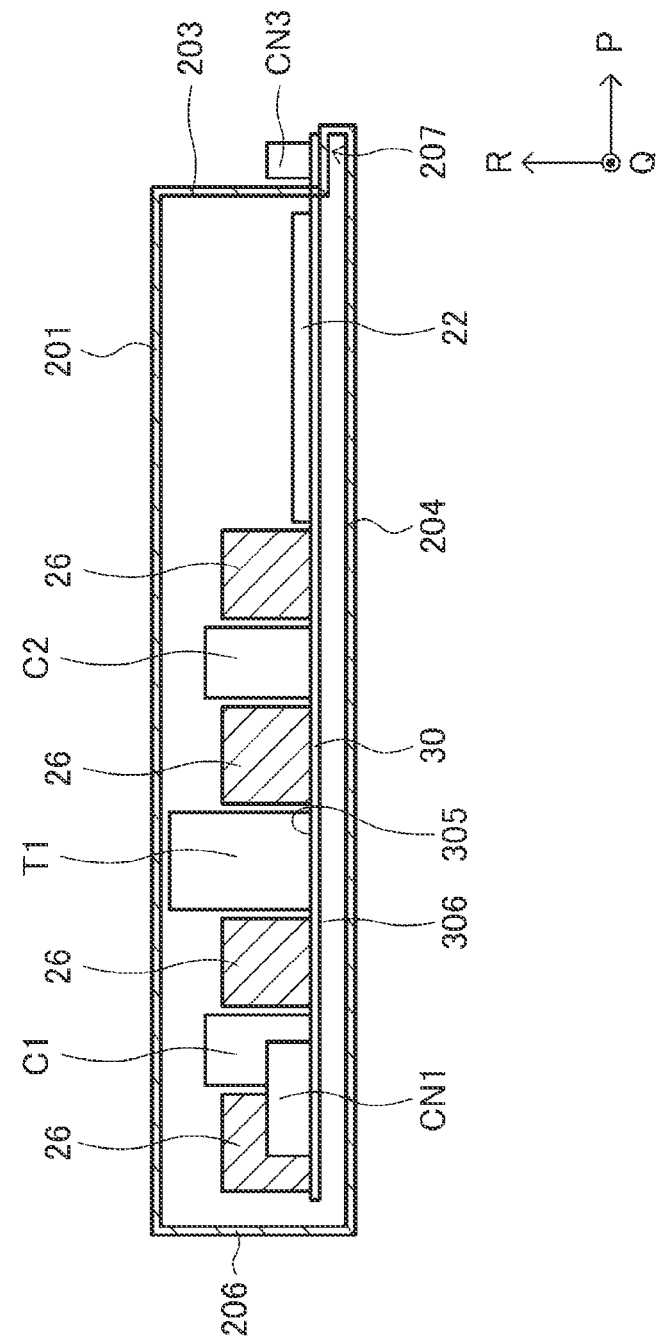
FIG. 12 illustrates a cross-sectional structure of the power unit taken along line XII-XII in FIG. 11.

With reference to FIG. 11 and FIG. 12, an internal structure of the power unit 20 will be described. FIG. 11 illustrates an internal structure of the housing 200 when the power unit 20 is viewed from the +R side. FIG. 12 illustrates a cross-sectional structure of the power unit 20 taken along line XII-XII in FIG. 11. In FIG. 11, the wall section 201 of the housing 200 is omitted for the illustration of the internal structure of the power unit 20.

As illustrated in FIG. 11 and FIG. 12, in the housing 200, the surface 305 and the surface 306 of the substrate 30 are arranged in the direction in which the wall section 204 of the housing 200 extends. More specifically, in the housing 200, the substrate 30 is arranged such that the surface 305, on which the power supply circuit 21, the switch circuit 22, the charging circuit 23, the voltage conversion circuit 24, the control circuit 25, and the connectors CN1 to CN3 are mounted, is arranged on the wall section 201 side, and the surface 306 that is different from the surface 305 is arranged on the wall section 204 side, the connector CN1 is arranged in the opening 208, and the connectors CN2 and CN3 are arranged to be exposed on the protrusion 207.

The solid state battery 26 is provided on the surface 305 side of the substrate 30. More specifically, the solid state battery 26 is disposed such that a shortest distance between the solid state battery 26 and the surface 305 is shorter than a shortest distance between the solid state battery 26 and the surface 306.

That is, in the housing 200, the power supply circuit 21 that includes a plurality of elements including the transformer T1 and the capacitors C1 and C2 is mounted on the surface 305 of the substrate 30. The power supply circuit 21 includes the transformer T1 and the capacitors C1 and C2, and the substrate 30 has the surface 305 and the surface 306 that is different from the surface 305, and the transformer T1 and the capacitors C1 and C2 are disposed on the surface 305 of the substrate 30. The solid state battery 26 is provided on the surface 305 side of the substrate 30. More specifically, the solid state battery 26 is disposed such that a shortest distance between the solid state battery 26 and the surface 305 is shorter than a shortest distance between the solid state battery 26 and the surface 306. The transformer T1 is an example first element, and the capacitor C1 or the capacitor C2 is an example second element.

As illustrated in FIG. 11 and FIG. 12, the solid state battery 26 is disposed, in the power supply circuit 21, between the transformer T1 and the capacitor C1 and between the transformer T1 and the capacitor C2 such that the areas on which the transformer T1 and the capacitors C1 and C2 are mounted are avoided. In other words, the solid state battery 26 is disposed such that at least part of the solid state battery 26 is disposed between the transformer T1 and the capacitor C1, or between the transformer T1 and the capacitor C2. In FIG. 11, the solid state battery 26 has openings to avoid the areas where the transformer T1 and the capacitors C1 and C2 are mounted on the substrate 30; however, the arrangement is not limited to this example.

In a circuit that has an inductance element including the transformer T1 such as the flyback circuit described as the power supply circuit 21, a magnetic field is generated around the inductance element due to the electric current flowing through the inductance element. As a result, circuits that are disposed around the inductance element may become unstable in operation due to the effect of the magnetic field. Accordingly, in the flyback circuit like the power supply circuit 21 according to the embodiment, the arrangement of the circuits around the transformer T1 has limitations. Due to the limitations, in reducing the size of the power unit 20, the effective use of the space may be limited.

In addition, in the flyback circuit described as the power supply circuit 21 according to the embodiment, the voltage VAC that is a commercial AC power supply is converted into the voltages VDC that are direct voltages, and thus sufficient voltage endurance and current endurance are required for the transformer T1 that performs the voltage conversion and the capacitors C1 and C2 that perform the voltage conversion of the voltages before and after the conversion. As a result, the sizes of the transformer T1 and the capacitors C1 and C2 are increased, and the spaces around the transformer T1 are also increased.

To address the problems, in this embodiment, the solid state battery 26 is disposed around the transformer T1. As described above, the solid state battery 26 is an all-solid-state battery that includes an inorganic solid material containing ceramic or the like as an electrolyte. Accordingly, as compared to secondary batteries such as electrolyte batteries that contain a liquid electrolyte, such as lithium-ion batteries used in known mobile devices, the solid state battery 26 has a higher degree of freedom in shape, and furthermore, the variations in characteristic with respect to changes in ambient temperature are small. Consequently, the solid state battery 26 can be fitted into the space formed around the transformer T1 but the solid state battery 26 is less subject to the heat that is produced in the transformer T1.

The arrangement of the solid state battery 26 in the relatively large space around the transformer T1 enables the effective use of the inner space of the housing 200 in the power unit 20 and enables the solid state battery 26 to have a larger size. With this configuration, the power unit 20 can be downsized whereas the capacity of the solid state battery 26 can be increased. Accordingly, while the portability of the mobile device M, or the mobile printer 1, that includes the power unit 20 according to the embodiment is not impaired, the mobile device M, or the mobile printer 1, can be powered for a longer time.

In this embodiment, at least part of the solid state battery 26 is disposed between the transformer T1 and the capacitor C1 or between the transformer T1 and the capacitor C2; however, at least part of the solid state battery 26 may be disposed between the transformer t1 and the diode bridge DB, or between the transformer T1 and the transistor Q1. As described above, the solid state battery 26 is disposed around the transformer T1. However, the solid state battery 26 may be disposed to fit into any space in the housing 200 depending on the circuit configuration of the power supply circuit 21 in the power unit 20, and the arrangement of the solid state battery 26 is not limited to the area around the transformer T1.

1. 4 Operational Effects

As described above, in the mobile device M, or the mobile printer 1, that includes the power unit 20 according to the embodiment, the power unit 20 includes the power supply circuit 21 that converts a voltage VAC, which is an alternating voltage as a commercial AC power supply, into voltages VDC, which are direct voltages, and outputs the voltage VDC1 of the voltages VDC, the substrate 30 with the power supply circuit 21 mounted thereon, and the solid state battery 26 that outputs a voltage VDC3 corresponding to an electric charge that is stored based on the voltage VDC2 of the voltages VDC. The power supply circuit 21 and the solid state battery 26 are accommodated in one housing 200.

The solid state battery 26 contains a solid electrolyte, and thus has higher safety, a higher degree of freedom in shape, and a wider operating temperature range than known lithium-ion batteries. By fitting the solid state battery 26 into a space available in a state in which the power supply circuit 21 is accommodated in the housing 200, while the risk of deterioration in the characteristics of the power unit 20 and an increase in size of the power unit 20 can be reduced, an increase in capacity of the solid state battery 26 can be achieved.

Furthermore, the power unit 20 includes the power supply circuit 21 that converts a voltage VAC that is a commercial AC power supply into voltages VDC that are direct voltages, and thus it is not necessary to carry around an additional power supply circuit such as an AC adapter for charging the solid state battery 26 together with the mobile device. As a result, the portability of the mobile device M, or the mobile printer 1, that includes the power unit 20 is less impaired.

Accordingly, the mobile device M, or the mobile printer 1, that includes the power unit 20 according to the embodiment can be powered for a longer time, and its portability can be ensured.

1. 5 Modifications

The mobile printer 1 as the mobile device M according to the first embodiment is a serial ink jet printer that reciprocates the carriage 121 in the X-axis direction in the housing 100 and discharges an ink from the discharge head 120 in synchronization with the reciprocation. Alternatively, a line ink jet printer that has a plurality of discharge heads 120 in a direction intersecting a medium transport direction and discharges an ink from each of the discharge heads 120 as a medium is transported may be used. The mobile device M that includes the mobile printer 1 of such a structure can also achieve operational effects similar to those of the mobile device M according to the first embodiment.

Furthermore, in the mobile printer 1 as the mobile device M according to the first embodiment, the liquid storage section 123 for storing an ink is mounted on the carriage 121 in the housing 100. However, the liquid storage section 123 may be disposed at a predetermined position in the housing 100 other than the carriage 121. The mobile device M that is the mobile printer 1 of such a structure can also achieve operational effects similar to those of the mobile device M according to the first embodiment.

In the mobile printer 1 as the mobile device M according to the first embodiment, the power supply circuit 21, the switch circuit 22, the charging circuit 23, the voltage conversion circuit 24, the control circuit 25, and the connectors CN1 to CN3 are mounted on the surface 305 of the substrate 30. Alternatively, some of the power supply circuit 21, the switch circuit 22, the charging circuit 23, the voltage conversion circuit 24, the control circuit 25, and the connectors CN1 to CN3 may be mounted on the surface 305 of the substrate 30, and the other components of the power supply circuit 21, the switch circuit 22, the charging circuit 23, the voltage conversion circuit 24, the control circuit 25, and the connectors CN1 to CN3 may be mounted on the surface 306 of the substrate 30. The mobile device M that is the mobile printer 1 of such a structure can also achieve operational effects similar to those of the mobile device M according to the first embodiment.

2. Second Embodiment

Hereinafter a mobile printer 1 as a mobile device M according to a second embodiment will be described. In the description of the mobile printer 1 as the mobile device M according to the second embodiment, to components similar to those in the first embodiment, the same reference numerals as those in the first embodiment are given to omit or simplify their overlapping descriptions.

Figure 13:
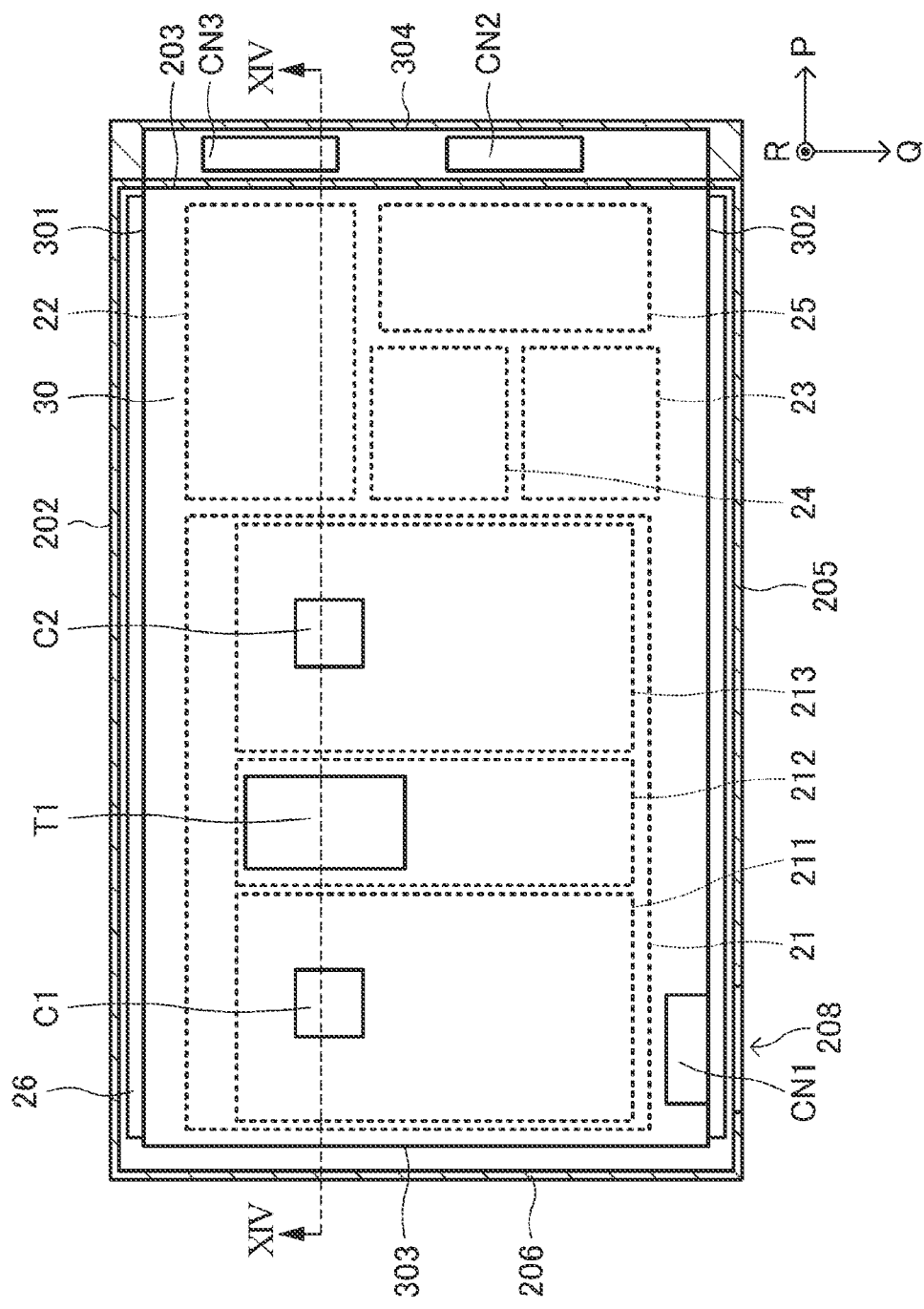
FIG. 13 illustrates an internal structure of a housing of a power unit according to a second embodiment viewed from the +R side.
Figure 14:
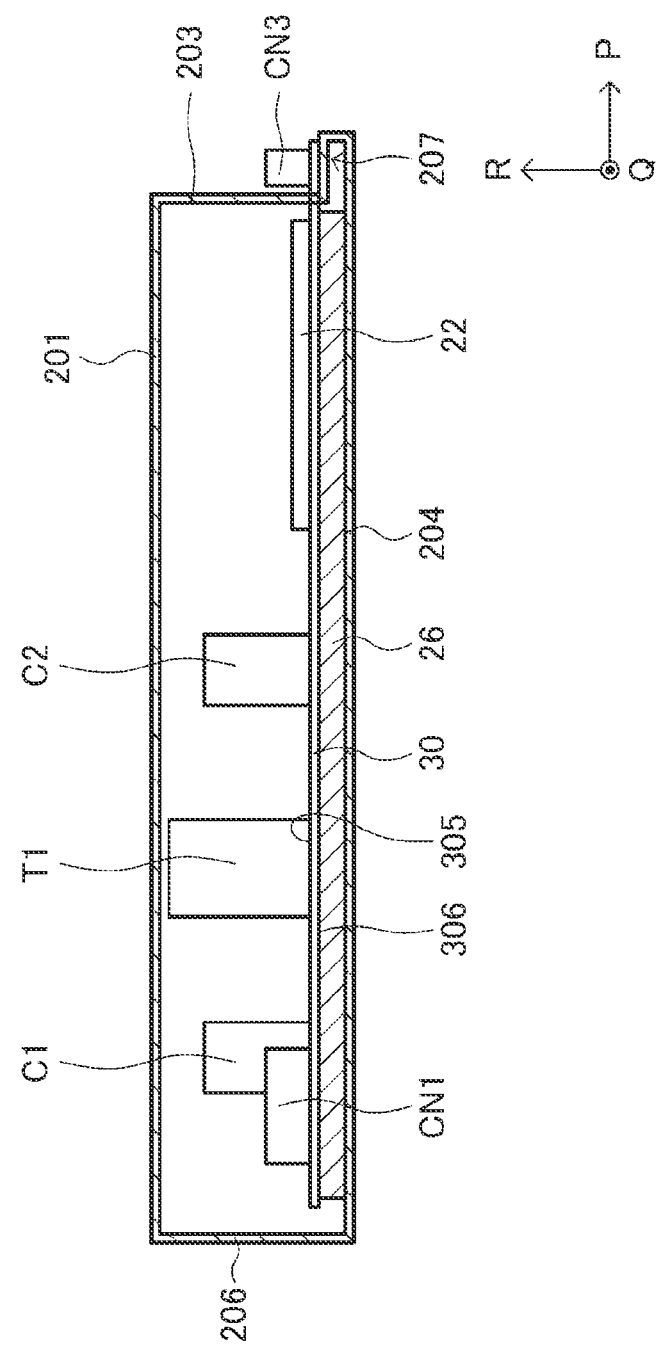
FIG. 14 illustrates a cross-sectional structure of the power unit according to the second embodiment taken along line XIV-XIV in FIG. 13.

FIG. 13 illustrates an internal structure of a housing 200 of a power unit 20 according to the second embodiment viewed from the +R side. FIG. 14 illustrates a cross-sectional structure of the power unit 20 according to the second embodiment taken along line XIV-XIV in FIG. 13. The mobile device M according to the second embodiment, or the mobile printer 1, illustrated in FIG. 13 and FIG. 14 has a solid state battery 26 in the power unit 20 that is arranged differently from the solid state battery 26 in the mobile device M, or the mobile printer 1, according to the first embodiment.

As illustrated in FIG. 13 and FIG. 14, in the power unit 20 according to the second embodiment, the solid state battery 26 is disposed on the surface 306 that is different from the surface 305 on which the transformer T1 of the power supply circuit 21 is mounted. More specifically, the transformer T1 of the power supply circuit 21 is mounted on the surface 305 of the substrate 30, and the solid state battery 26 is disposed such that a shortest distance between the solid state battery 26 and the surface 306 of the substrate 30 is shorter than a shortest distance between the solid state battery 26 and the surface 305 of the substrate 30.

In the flyback circuit described as the power supply circuit 21, the voltage VAC that is an alternating voltage as the commercial AC power supply is converted into the voltages VDC that are direct voltages, and thus sufficient voltage endurance and current endurance are required for the transformer T1 that performs the voltage conversion and the capacitors C1 and C2 that perform the voltage conversion of the voltages before and after the conversion. As a result, the transformer T1 and the capacitors C1 and C2 tend to become large, and thus the weights of the transformer T1 and the capacitors C1 and C2 also tend to increase. Such components of the size and weight may fall off the substrate 30 due to the weights of the components, and this may cause poor electrical connection and may cause the mounted circuit elements to fall off the substrate 30.

To address the problem, each of the transformer T1 and the capacitors C1 and C2 is provided with a lead through which signals are input or output, and the leads are inserted from the surface 305 through the substrate 30 to the surface 306, and then components such as the transformer T1 and the capacitors C1 and C2 are fixed to the substrate 30. In other words, large components such as the transformer T1 and the capacitors C1 and C2 may be formed as lead insertion components. With this configuration, the components such as the transformer T1 and the capacitors C1 and C2 can be mounted on the substrate 30 more firmly, and poor electrical connection in the power supply circuit 21 and the risk of falling of the mounted circuit elements can be reduced.

When components such as the transformer T1 and the capacitors C1 and C2 are lead insertion components, the leads extend through the substrate 30 onto the surface 306 of the substrate 30 on which such components like the transformer T1 and the capacitors C1 and C2 are not mounted. Consequently, in the power unit 20, on the surface 306 side of the substrate 30, a space is formed to increase the insulation performance of the power supply circuit 21.

In the power unit 20 according to the embodiment, the solid state battery 26 is disposed in the space that is formed to increase the insulation performance of the power supply circuit 21. As a result, the space can be effectively used, enabling downsizing of the power unit 20 and an increase in size of the solid state battery 26, leading to an increase in capacity of the solid state battery 26.

In addition, the solid state battery 26 is an all-solid-state battery that includes an inorganic solid material containing ceramic or the like as an electrolyte, and thus, if the solid state battery 26 is damaged due to the leads that extend from the surface 305 through the substrate 30 onto the surface 306, the risk of leakage of the electrolyte from the solid state battery 26 can be reduced. As compared to a configuration that includes an electrolyte battery such as a lithium-ion battery on the surface 306 side of the substrate 30, the voltage that is output from the solid state battery 26 can be stabilized, enabling stable output characteristics in the power unit 20.

As described above, similarly to the power unit 20 according to the first embodiment and the mobile device M, or the mobile printer 1, that includes the power unit 20, in the power unit 20, the mobile device M, and the mobile printer 1 according to the second embodiment, the portability of the mobile device M, or the mobile printer 1, is not impaired, and the mobile device M, or the mobile printer 1, can be powered for a longer time. As compared to a power unit 20 that includes a liquid electrolyte such as a lithium-ion battery, the mobile device M, or the mobile printer 1, that includes the power unit 20 can achieve stable characteristics.

3. Other Embodiments of Mobile Device

In the mobile devices M according to the first embodiment and the second embodiment, the mobile printers 1 are described as example portable liquid discharge apparatuses. Alternatively, the mobile devices M may be any battery-powered portable device, for example, a smart phone, a tablet terminal, a mobile phone, a computer, or a digital audio player. In such a case, operational effects similar to those in the first embodiment and/or the second embodiment can be achieved.

Although the embodiments and modifications have been described in the above description, the disclosure is not limited to the above-described embodiments and modifications, and various modifications may be made without departing from the scope of the disclosure. For example, the embodiments may be appropriately combined.

The disclosure includes structures and configurations substantially similar to those in the above-described embodiments, for example, structures and configurations that can achieve similar functions, methods, or results, or similar objects and effects. Furthermore, the disclosure includes structures and configurations in which components that are not essential to the structures and configurations described in the embodiments are replaced. Furthermore, the disclosure includes structures and configurations that can achieve operational effects similar to those in the embodiments or structures and configuration that can achieve objects similar to those in the embodiments. Furthermore, the disclosure includes structures and configurations to which known arts are added.

What is claimed is:

1. A liquid discharge apparatus comprising:
   a drive signal output circuit configured to output a drive signal;
   a drive section comprising a discharge head configured to discharge a liquid in accordance with the drive signal;
   a power unit configured to supply a power source voltage to the drive signal output circuit; and
   a first housing that accommodates the drive signal output circuit, the drive section, and the power unit, wherein the power unit comprises
   a power supply circuit configured to convert an alternating voltage into a first direct voltage and a second direct voltage, and output the first direct voltage as the power source voltage;
   a substrate on which the power supply circuit is provided;
   a solid state battery configured to output a third direct voltage corresponding to a stored electric charge as the power source voltage;
   a charging circuit configured to store an electric charge in the solid state battery based on the second direct voltage; and
   a second housing that accommodates the power supply circuit, the solid state battery, and the charging circuit.

2. The liquid discharge apparatus according to claim 1, wherein
   the power supply circuit includes a first element and a second element that is different from the first element,
   the substrate has a first surface and a second surface that is different from the first surface,
   the first element and the second element are disposed on the first surface of the substrate,
   a shortest distance between the solid state battery and the first surface is shorter than a shortest distance between the solid state battery and the second surface, and
   the solid state battery is disposed between the first element and the second element.

3. The liquid discharge apparatus according to claim 1, wherein
   the power supply circuit includes a first element,
   the substrate has a first surface and a second surface that is different from the first surface,
   the first element is disposed on the first surface, and
   a shortest distance between the solid state battery and the second surface is shorter than a shortest distance between the solid state battery and the first surface.

4. The liquid discharge apparatus according to claim 2, wherein the first element is a coil.

5. The liquid discharge apparatus according to claim 1, wherein the charging circuit is provided on the substrate.

6. The liquid discharge apparatus according to claim 1, wherein the power unit includes a switch circuit configured to switch between outputting the first direct voltage as the power source voltage and outputting the third direct voltage as the power source voltage.

* * * * *